Nov. 21, 1961 G. W. LISKEY 3,009,506
APPARATUS FOR ADJUSTING THE WHEELS OF AN AUTOMOBILE
Filed June 25, 1957
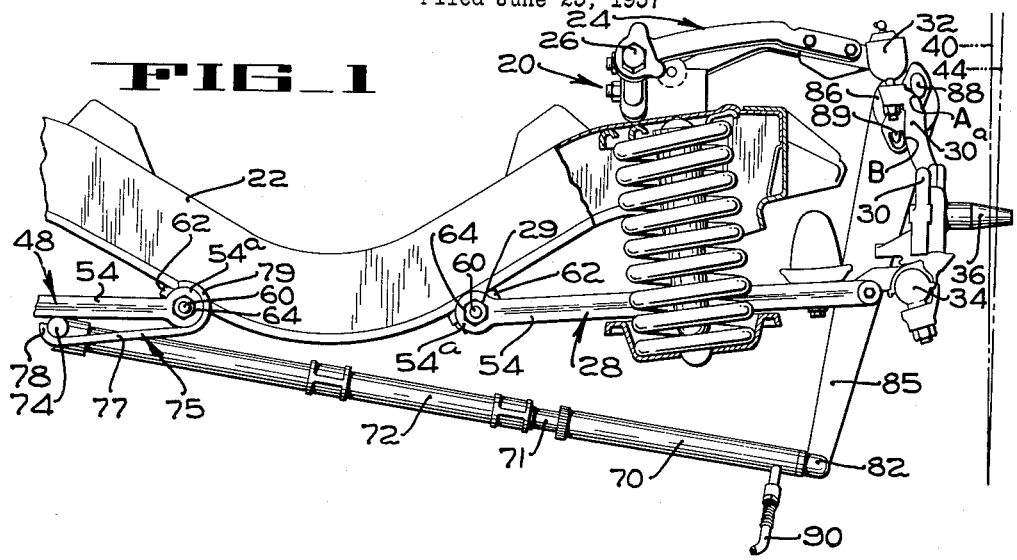
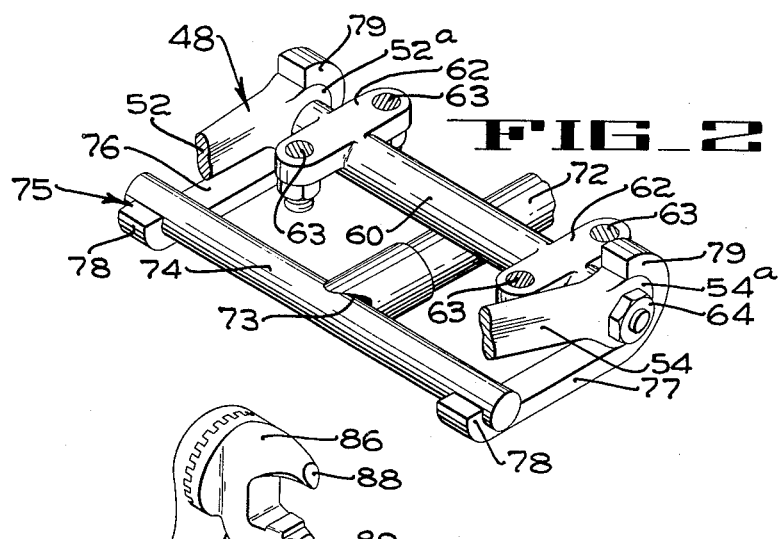
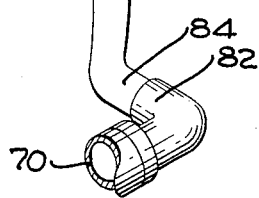
INVENTOR
GEORGE W. LISKEY
BY *Hans G. Hoffmeister*
ATTORNEY United States Patent Office 3,009,506
Patented Nov. 21, 1961

3,009,506
APPARATUS FOR ADJUSTING THE WHEELS
OF AN AUTOMOBILE
George W. Liskey, Okemos, Mich., assignor to FMC
Corporation, a corporation of Delaware
Filed June 25, 1957, Ser. No. 667,858
1 Claim. (Cl. 153—32)

This invention pertains to apparatus for adjusting the wheels of an automobile to correct alignment characteristics of the wheels, and more particularly relates to a tool for bending one of the elements of an independent front wheel suspension of an automobile for varying the camber angle of the associated wheel.

One of the tools presently used for adjusting camber consists of a power cylinder that is arranged to be anchored on a part of the undercarriage of the automobile with the free end of the plunger of the cylinder engaged around the member of the wheel suspension that is to be bent. When the power cylinder is energized, the plunger exerts a bending force on the suspension member and causes it to be bent the amount required to obtain the desired camber angle. One of the problems encountered in the use of such tool is the problem of finding a suitable anchor on the undercarriage of the automobile.

It is an object of the present invention to provide a tool that may be quickly and easily anchored to the undercarriage of an automobile.

Another object is to provide a tool that can be efficiently attached to or removed from the undercarriage of a vehicle having an independently sprung front wheel suspension.

Other and further objects of the present invention will become apparent from the following description taken in connection with the attached drawing in which:

FIG. 1 is a fragmentary diagrammatic front elevation of a portion of an independently sprung front wheel suspension, showing the camber correcting tool of the present invention mounted thereon.

FIG. 2 is a perspective of an anchor bracket shown connected on a portion of the undercarriage of an automobile.

FIG. 3 is a fragmentary perspective of a portion of the camber correcting tool.

Referring to FIG. 1, the reference number 20 indicates a wheel suspension assembly mounted on one side of a frame or chassis 22 of an automobile. The assembly 20 is a typical knee-action type unit comprising an upper control arm 24 pivotally attached at 26 to the frame, a lower control arm 28 pivoted at 29 to the frame, and a wheel mounting member or spindle support arm 30 that is connected to the upper control arm by a ball joint 32 and to the lower control arm by a ball joint 34. It is to be particularly noted that the upper portion 30a of the spindle support arm 30 is bowed inwardly toward the frame. A spindle 36, which may be integrally formed on the spindle support arm 30, is arranged to rotatably journal one of the wheels (not shown) of the automobile. The dot-dash line 40 indicates a vertical plane passing through the wheel, while the dot-dash line 44 indicates the camber angle of the wheel.

On the opposite side of the frame, a lower control arm 48 of the knee-action suspension of the other front wheel of the automobile is shown pivotally connected to the frame 22. Both of the lower control arms 28 and 48 are identical V-shaped members, each of which is connected at its apex to the associated lower ball joint 34 and has two diverging arms 52 and 54 (FIG. 2). Hub portions 52a and 54a of the arms 52 and 54, respectively, are pivotally disposed on a rod 60 which is secured to the undersurface of the frame 22 by two pairs of ears 62 which are formed on the rod and have openings receiving bolts 63 projecting from the frame. Nuts 64 disposed on the threaded ends of the rod 60 hold the arms on the rod.

A single acting power cylinder 70 (FIG. 1) is provided with a plunger 71 which has an extension 72. A transverse groove or socket 73 (FIG. 2) on the end of the extension 72 engages or abuts a cross bar 74 of a hook unit 75. The hook unit has a pair of rigid arms 76 and 77, each of which has a curved end portion 78 welded to the cross bar 74, and a hooked end portion 79 which is arranged to be disposed in hooked engagement over one of the hubs 52a or 54a. With this arrangement, the hooked ends 79 abut the hubs 52a or 54a and provide a pivotable, self-adjusting mounting for the hook unit, and the cross bar 74 provides an anchor for the power cylinder.

The power cylinder 70 has a socket 82 (FIG. 3) formed on one end to receive the shank 84 of a lever 85. A removable head 86 is disposed in driven engagement on the outer end of the lever 85 and is provided with two laterally projecting abutments or arms 88 and 89. A connection 90 (FIG. 1) is arranged to deliver fluid under pressure to the power cylinder from a suitable source.

In adjusting the camber angle of the dirigible front wheel on one side of the automobile, the anchoring unit 75 is first hooked over the hubs 52a and 54a of the lower control arm on the opposite side of the frame. The groove 73 at the end of the power cylinder plunger is disposed in engagement with the cross bar 74 of the hook unit, and the lateral arms 88 and 89 of the adjusting head 86 are disposed on opposite sides of the upper portion 30a of the spindle support arm 30 to contact the arms at points A and B. Then, when pressurized fluid is directed to the power cylinder 70, the housing of the cylinder will be forced out away from the plunger 71 and will tend to pivot the level 85 in a generally counterclockwise direction (FIG. 1) about point A. Pressure is thus applied to point B tending to straighten out the bowed portion 30a of the support arm 30, and swing the spindle 36 clockwise about ball joint 34 to increase the camber angle. The increase in the camber angle may be represented by an increase in the angle between dot-dash line 44 and dot-dash line 40 which represents a vertical plane through the wheel.

From the foregoing description it will be recognized that this invention provides a tool that may be quickly installed in operating position. The hook unit 75 makes possble the use of the power cylinder 70 with automobiles that have no abutment surfaces on the undersurface of the frame other than the pivotal mounting of the lower control arms. Further, the pivotal engagement of the hook unit makes the unit self-adjusting, it being evident that, if the central portion of the frame 22 is disposed at a lower level than that shown in FIG. 1, the hook unit will swing to a more nearly vertical position, permitting the power cylinder to assume a lower position.

It will be understood that modifications and variations may be effected without departing from the scope of the novel concepts of the present invention.

Having thus described my invention, what I claim as new and desire to protect by Letters Patent is:

An apparatus for correcting the camber angle of automobile front wheels of the type having independent suspensions each of which includes a wheel mounting member bendable to adjust the camber angle and a lower control arm with spaced hubs pivoted on the frame adjacent a depressed frame member, said apparatus comprising a lever having an upper end portion provided with spaced laterally projecting abutments adapted to be disposed in gripping engagement with the wheel mounting member of a wheel on one side of the automobile to bend the member when said lever is actuated; a power cylinder adapted to be disposed transversely of the vehicle below the depressed frame member and having a first portion projecting laterally from the longitudinal centerline of the automobile toward said lever when said lever is engaged with the wheel mounting member for pivotal connection to the lower end of said lever, said cylinder having a second portion projecting in the opposite direction from said longitudinal centerline and having a socket at its extremity; and an anchoring device including a rigid bar, a pair of rigid hooks adapted to be disposed in self-adjusting pivotal engagement with the hubs of the wheel suspension on the opposite side of the automobile, a rigid arm connected between each hook and said bar and projecting laterally from said longitudinal centerline in the same general direction as said second portion of said power cylinder, the socket in the extremity of said second portion being arranged to pivotally receive the bar of said anchoring device whereby, when said power cylinder is energized, a pull will be exerted on the rigid arms and hooks of said anchoring device to firmly seat said hooks, and said lever will be actuated to impart a turning moment to said lever to bend said wheel mounting member.

References Cited in the file of this patent

UNITED STATES PATENTS

| | | |
|---|---|---|
| 1,639,788 | Uline | Aug. 23, 1927 |
| 1,818,678 | Bennett | Aug. 11, 1931 |
| 2,365,731 | Simons | Dec. 26, 1944 |
| 2,427,536 | Simons | Sept. 16, 1947 |
| 2,431,291 | Wochner | Nov. 18, 1947 |
| 2,635,668 | Redinbaugh | Apr. 21, 1953 |
| 2,764,215 | Adams et al. | Sept. 25, 1956 |
| 2,778,401 | Wilkerson | Jan. 22, 1957 |

FOREIGN PATENTS

| | | |
|---|---|---|
| 603,171 | France | Jan. 7, 1926 |